(12) United States Patent
Gandhi et al.

(10) Patent No.: US 11,601,356 B2
(45) Date of Patent: Mar. 7, 2023

(54) EMULATING PACKET FLOWS TO ASSESS NETWORK LINKS FOR SD-WAN

(71) Applicant: VMware, Inc., Palo Alto, CA (US)

(72) Inventors: Rohan Gandhi, Pune (IN); Avinash Nigam, Pune (IN); Sandip Shah, Fremont, CA (US); Philip Brighten Godfrey, Champaign, IL (US); Ambarish P. Pande, Akola (IN); Gourab Ghosh, Siliguri (IN); Prashant Jain, Jaipur (IN); Shashank Ranjan, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/227,044

(22) Filed: Apr. 9, 2021

(65) Prior Publication Data
US 2022/0210042 A1    Jun. 30, 2022

(30) Foreign Application Priority Data

Dec. 29, 2020  (IN) .............................. 202041056980
Dec. 29, 2020  (IN) .............................. 202041056982

(51) Int. Cl.
*H04L 43/12*     (2022.01)
*H04L 45/50*     (2022.01)
*H04L 43/0876*   (2022.01)

(52) U.S. Cl.
CPC .......... *H04L 43/12* (2013.01); *H04L 43/0876* (2013.01); *H04L 45/50* (2013.01)

(58) Field of Classification Search
None
See application file for complete search history.

(56) References Cited

U.S. PATENT DOCUMENTS

| | | |
|---|---|---|
| 5,652,751 A | 7/1997 | Sharony |
| 5,909,553 A | 6/1999 | Campbell et al. |
| (Continued) | | |

FOREIGN PATENT DOCUMENTS

| | | |
|---|---|---|
| CN | 1926809 A | 3/2007 |
| CN | 102577270 A | 7/2012 |
| (Continued) | | |

OTHER PUBLICATIONS

Lasserre, Marc, et al., "Framework for Data Center (DC) Network Virtualization," RFC 7365, Oct. 2014, 26 pages, IETF.
(Continued)

*Primary Examiner* — Anh Nguyen
(74) *Attorney, Agent, or Firm* — Adeli LLP

(57) ABSTRACT

Some embodiments provide a novel method for assessing the suitability of network links for connecting compute nodes located at different geographic sites. The method of some embodiments identifies and analyzes sample packets from a set of flows exchanged between first and second compute sites that are connected through a first network link in order to identify attributes of the sampled packets. The method also computes attributes of predicted packets between the identified samples in order to identify attributes of each flow in the set of flows. The method then uses the identified and computed attributes of each flow in the set of flows to emulate the set of flows passing between the two compute sites through the second network link in order to assess whether a second network link should be used for future flows (e.g., future flows exchanged between the first and second compute sites).

19 Claims, 10 Drawing Sheets

(56) References Cited

U.S. PATENT DOCUMENTS

| | | | |
|---|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 * | 4/2018 | Tillotson ............... H04W 24/08 |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Ku |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 * | 1/2019 | Appleby ............... H04L 47/127 |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchai et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |

(56) References Cited

U.S. PATENT DOCUMENTS

| | | |
|---|---|---|
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Masseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Moni et al. |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0028092 A1 | 1/2009 | Rothschild |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0268605 A1* | 10/2009 | Campbell ............ H04L 45/125 370/254 |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1* | 4/2010 | Hiscock ................ H04L 47/34 370/412 |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Ku et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Fan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Kamada |
| 2012/0317270 A1 | 12/2012 | Vrbaski et al. |

(56) References Cited

U.S. PATENT DOCUMENTS

| | | |
|---|---|---|
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0185729 A1 | 7/2013 | Vasic et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Mias et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Mn et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Ku |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Ku |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Ku |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |

(56) References Cited

U.S. PATENT DOCUMENTS

| | | |
|---|---|---|
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |

(56) References Cited

U.S. PATENT DOCUMENTS

| | | |
|---|---|---|
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0327109 A1 | 10/2019 | Guichard et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0092062 A1 | 3/2021 | Dhanabalan et al. |
| 2021/0105199 A1 | 4/2021 | H et al. |
| 2021/0112034 A1 | 4/2021 | Sundararajan et al. |
| 2021/0126830 A1 | 4/2021 | R et al. |
| 2021/0126853 A1 | 4/2021 | Ramaswamy et al. |

(56) References Cited

U.S. PATENT DOCUMENTS

| | | |
|---|---|---|
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0166713 A1 | 5/2022 | Markuze et al. |
| 2022/0210041 A1 | 6/2022 | Gandhi et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |

FOREIGN PATENT DOCUMENTS

| | | |
|---|---|---|
| CN | 102811165 A | 12/2012 |
| CN | 104956329 A | 9/2015 |
| CN | 106656847 A | 5/2017 |
| CN | 110447209 A | 11/2019 |
| CN | 111198764 A | 5/2020 |
| EP | 1912381 A1 | 4/2008 |
| EP | 3041178 A1 | 7/2016 |
| EP | 3509256 A1 | 7/2019 |
| JP | 2010233126 A | 10/2010 |
| JP | 2017059991 A | 3/2017 |
| RU | 2574350 C2 | 2/2016 |
| WO | 33073701 A1 | 9/2003 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022154850 A1 | 7/2022 |
| WO | 2022159156 A1 | 7/2022 |

OTHER PUBLICATIONS

Lin, Weidong, et al., "Using Path Label Routing in Wide Area Software-Defined Networks with Open Flow," 2016 International Conference on Networking and Network Applications, Jul. 2016, 6 pages, IEEE.

Non-Published Commonly Owned U.S. Appl. No. 17/240,890, filed Apr. 26, 2021, 325 pages, VMware, Inc.

Non-Published Commonly Owned U.S. Appl. No. 17/240,906, filed Apr. 26, 2021, 18 pages, VMware, Inc.

Non-Published Commonly Owned U.S. Appl. No. 17/467,378, filed Sep. 6, 2021, 157 pages, VMware, Inc.

Non-Published Commonly Owned U.S. Appl. No. 17/474,034, filed Sep. 13, 2021, 349 pages, VMware, Inc.

Guo, Xiangyi, et al., (U.S. Appl. No. 62/925,193) filed Oct. 23, 2019, 26 pages.

Non-Published Commonly Owned U.S. Appl. No. 17/542,413, filed Dec. 4, 2021, 173 pages, VMware, Inc.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.eom/c/dam/r/ciscolive/emea/docs/2020/pdf/BRKRST-2558.pdf.

Barozei, Jean-Marc, "Cisco SD-WAN," Deep Dive, Dec. 2017, 185 pages, Cisco, Retrieved from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages. vol. 5, IEEE, retrieved from https://ieeexplore.ieee.org/document/8066287.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.IEEE.org/document/8784036.

Long, Feng, "Research and Application of Cloud Storage Technology in University Information Service," Chinese Excellent Masters'

(56) References Cited

OTHER PUBLICATIONS

Theses Full-text Database, Mar. 2013, 72 pages, China Academic Journals Electronic Publishing House, China.
Non-Published Commonly Owned U.S. Appl. No. 17/562,890 (N774.CIP1.C2), filed Dec. 27, 2021, 36 pages, Nicira, Inc.
Mon-Published Commonly Owned U.S. Appl. No. 17/572,583 (N777 02 C1), filed Jan. 10, 2022, 33 pages, Nicira, Inc.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 16/851,294, filed Apr. 17, 2020, 59 pages, VMware, Inc.
Non-Published Commonly Owned U.S. Appl. No. 16/851,301, filed Apr. 17, 2020, 59 pages, VMware, Inc.
Non-Published Commonly Owned U.S. Appl. No. 16/851,308, filed Apr. 17, 2020, 59 pages, VMware, Inc.
Non-Published Commonly Owned U.S. Appl. No. 16/851,314, filed Apr. 17, 2020, 59 pages, VMware, Inc.
Non-Published Commonly Owned U.S. Appl. No. 16/851,323, filed Apr. 17, 2020, 59 pages, VMware, Inc.
Non-Published Commonly Owned U.S. Appl. No. 16/851,397, filed Apr. 17, 2020, 59 pages, VMware, Inc.
Non-Published Commonly Owned U.S. Appl. No. 17/072,764, filed Oct. 16, 2020, 33 pages, VMware, Inc.
Non-Published Commonly Owned U.S. Appl. No. 17/072,774, filed Oct. 16, 2020, 34 pages, VMware, Inc.
Non-Published Commonly Owned U.S. Appl. No. 17/085,893, filed Oct. 30, 2020, 34 pages, VMware, Inc.
Non-Published Commonly Owned U.S. Appl. No. 17/085,916, filed Oct. 30, 2020, 35 pages, VMware, Inc.
Non-Published Commonly Owned U.S. Appl. No. 17/103,614, filed Nov. 24, 2020, 38 pages, VMware, Inc.
Non-Published Commonly Owned U.S. Appl. No. 17/143,092, filed Jan. 6, 2021, 42 pages, VMware, Inc.
Non-Published Commonly Owned U.S. Appl. No. 17/143,094, filed Jan. 6, 2021, 42 pages, VMware, Inc.
Non-Published Commonly Owned U.S. Appl. No. 17/194,038, filed Mar. 5, 2021, 35 pages, VMware, Inc.
Non-Published Commonly Owned Related U.S. Appl. No. 17/227,016 with similar specification, filed Apr. 9, 2021, 37 pages, VMware, Inc.
Non-Published Commonly Owned U.S. Appl. No. 17/233,427, filed Apr. 16, 2021, 124 pages, VMware, Inc.
Non-Published Commonly Owned U.S. Appl. No. 17/361,292, filed Jun. 28, 2021, 35 pages, Nicira, Inc.
Non-Published Commonly Owned U.S. Appl. No. 15/803,964, filed Nov. 6, 2017, 15 pages, The Mode Group.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Non-Published Commonly Owned U.S. Appl. No. 17/827,972, filed May 30, 2022, 30 pages, Nicira, Inc.
Non-Published Commonly Owned U.S. Appl. No. 17/850,112, filed Jun. 27, 2022, 41 pages, Nicira, Inc.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

\* cited by examiner

| Time | IP5Tuple | Data |
|---|---|---|
| 1:00PM | 10.0.0.1:10000 → 10.1.0.2:80 | 500 bytes of data |
| 1:00.02PM | 10.1.0.2:80 → 10.0.0.1:10000 | 1380 bytes of data |
| 1:00.03PM | 10.0.0.2:20000 → 10.1.1.1:80 | 300 bytes of data |
| 1:00.05PM | 10.1.1.1:80 → 10.1.1.1:20000 | 1000 bytes |

| Time | IP5Tuple | Data size |
|---|---|---|
| 1:00PM | 10.0.0.1:10000 → 10.1.0.2:80 | 500 bytes |
| 1:00.01PM | 10.1.0.2:80 → 10.0.0.1:10000 | 1380 bytes |
| 1:00.02PM | 10.1.0.2:80 → 10.0.0.1:10000 | 1380 bytes |
| 1:00.03PM | 10.0.0.2:20000 → 10.1.1.1:80 | 300 bytes |
| 1:00.05PM | 10.1.1.1:80 → 10.1.1.1:20000 | 1000 bytes |

| Time | IP5Tuple | Request/response |
|---|---|---|
| 1:00PM | 10.0.0.1:10000 → 10.1.0.2:80 | Request = 500 bytes<br>Response = 2760 bytes, app-delay = 10 msec |
| 1:00.03PM | 10.0.0.2:20000 → 10.1.1.1:80 | Request = 300 bytes<br>Response = 1000 bytes, app-delay = 20 msec |

*Figure 4*

| Time | IP5Tuple | Internet conditions |
|---|---|---|
| 1:00PM | 10.0.0.1:10000 → 10.1.0.2:80 | Time 1:00PM: RTT = 60 msec Peak BW = 2Mbps, drop% = 1% Time 1:05PM: RTT 50 msec, Peak BW = 4Mbps, drop% = 1% |
| 1:10PM | 10.0.0.2:20000 → 10.1.1.1:80 | Time 1:10PM: RTT = 100 msec Peak BW = 1Mbps, drop% = 2% |

*Figure 8*

| Time | IP5Tuple | Request/response | Internet conditions |
|---|---|---|---|
| 1:00PM | 10.0.0.1:10000 → 10.1.0.2:80 | Request = 500 bytes Response = 2760 bytes, delay = 10 msec | RTT = 60 msec Peak BW = 2Mbps Drop% = 1% |
| 1:00.03PM | 10.0.0.2:20000 → 10.1.1.1:80 | Request = 300 bytes Response = 1000 bytes, delay = 20 msec | RTT = 40 msec Peak BW = 1Mbps Drop% = 2% |

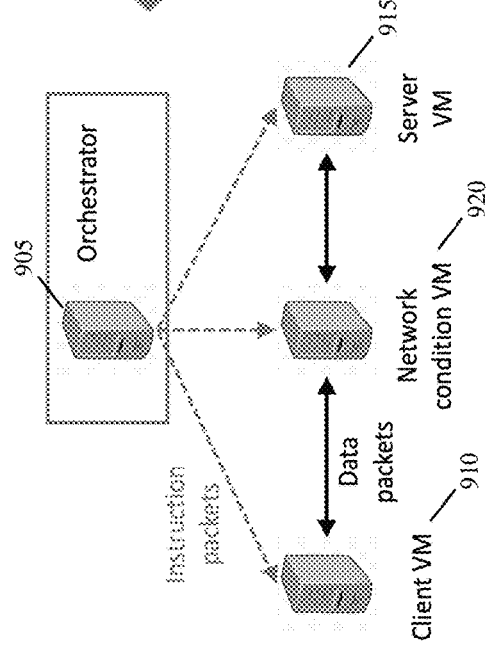

*Figure 9*

| Service | Performance(FCT) degradation on Internet | Traffic volume | Is moved to Internet? |
|---|---|---|---|
| Service-1 10.0.0.1:80 | 14% | 100GB | ✗ |
| Service-2 10.0.1.1:443 | 7% | 23GB | ✓ |
| Service-3 10.0.2.1:443 | 20% | 722GB | ✗ |
| Service-4 10.0.3.1:8080 | 11% | 172GB | ✗ |
| Service-5 10.0.1.1:454 | 2% | 86GB | ✓ |
| Service-6 10.1.1.1:443 | 8% | 928GB | ✓ |
| Service-7 10.2.1.1:443 | 8% | 96GB | ✓ |

*Figure 10*

EMULATING PACKET FLOWS TO ASSESS NETWORK LINKS FOR SD-WAN

BACKGROUND

In recent years, several companies have brought to market solutions for deploying software defined (SD) wide-area networks (WANs) for enterprises. Some such SD-WAN solutions use external third-party private or public cloud datacenters (clouds) to define different virtual WANs for different enterprises. These solutions typically have edge forwarding elements (called edge devices) at edge nodes of an enterprise that connect with one or more gateway forwarding elements (called gateway devices or gateways) that are deployed in the third-party clouds.

In such a deployment, an edge device connects through one or more secure connections with a gateway, with these connections traversing one or more network links that connect the edge device with an external network. Examples of such network links include MPLS links, 5G LTE links, commercial broadband Internet links (e.g., cable modem links or fiber optic links), etc. The edge nodes include branch offices (called branches) of the enterprise, and these offices are often spread across geographies with network links to the gateways of various different network connectivity types.

BRIEF SUMMARY

Some embodiments of the invention provide a novel method for assessing the suitability of network links for connecting compute nodes located at different geographic sites. The method of some embodiments performs this assessment to evaluate network links used to connect different sites in an SD-WAN. The method of some embodiments identifies and analyzes sample packets from a set of flows exchanged between first and second compute sites that are connected through a first network link in order to identify attributes of the sampled packets. The method also computes attributes of predicted packets between the identified samples in order to identify attributes of each flow in the set of flows.

The method then uses the identified and computed attributes of each flow in the set of flows to emulate the set of flows passing between the two compute sites through the second network link in order to assess whether a second network link should be used for future flows (e.g., future flows exchanged between the first and second compute sites). The assessment is performed in some embodiments to determine whether the second network link should be used for a subset of future flows between the first and second sites. In some embodiments, the second network link is less expensive and has a lower performance than the first network link. For instance, in some embodiments, the first network link is an MPLS link, while the second network link is a commercial Internet link (e.g., a cable modem).

The method of some embodiments computes attributes of predicted packets by first identifying one or more predicted packets between sampled packets of each flow in the set of flows, and identifying attributes of the predicted packets. In some embodiments, the identified and computed attributes include packet delay attributes. The method of some of these embodiments uses the identified and computed attributes for its emulation by first normalizing the identified and computed delays by removing predicted delays for packets traversing between the first and second compute sites through the first network link, and then using these normalized delays to perform its emulation.

In some embodiments, the normalized delays represent communication delays between processes that exchange the flows in the set of flows (e.g., between applications that execute on devices at the first and second sites) after the removal of the delays associated with the packet passing through the first network. In other words, the normalizing is performed in some embodiments to render the assessment regarding the use of the second network link agnostic (i.e., independent) of operating conditions of the first network link. To perform the normalizing, the method in some embodiments identifies sets of request flows and response flows between the first and second sites, computes the delay between a request flow and a response flow associated with the request flow (i.e., the request flow's corresponding response flow), and removes communication delay through the first network from each computed delay.

To perform its emulation, the method of some embodiments also monitors a set of operating conditions associated with the second network link, and uses the monitored set of operating conditions in the emulation. The emulation in some embodiments generates predicted attributes for the set of flows if the set of flows had been exchanged through the second network link. It then compares the generated predicted attributes for the packet flows through the second link with the identified and computed attributes associated with packet flows through the first link to compare the quality of the second network link with the quality of the first network link.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 4 illustrates examples of tables created by the network analyzing server in some embodiments.

FIG. 8 illustrates an example of a table produced by an emulator to summarize the Internet network conditions associated with two flows, which could be between the same pair of sites or between two different pairs of sites.

FIG. 9 illustrates how the emulator replays the client requests/responses through the commercial Internet connections of the first and second sites.

FIG. 10 illustrates an example of a report generated through a user interface.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for assessing the suitability of network links for connecting compute nodes located at different geographic sites. The method of some embodiments identifies and analyzes sample packets from a set of flows exchanged between first and second compute sites that are connected through a first network link in order to identify attributes of the sampled packets. The method also computes attributes of predicted packets between the identified sample packets in order to identify attributes of each flow in the set of flows. The method then uses the identified and computed attributes of each flow in the set of flows to emulate the set of flows passing between the two compute sites through the second network link in order to assess whether the second network link should be used for future flows (e.g., future flows exchanged between the first and second compute sites).

As used in this document, a packet refers to a collection of bits in a particular format sent across a network. One of ordinary skill in the art will recognize that the term packet is used in this document to refer to various formatted collections of bits that are sent across a network. The formatting of these bits can be specified by standardized protocols or non-standardized protocols. Examples of packets following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
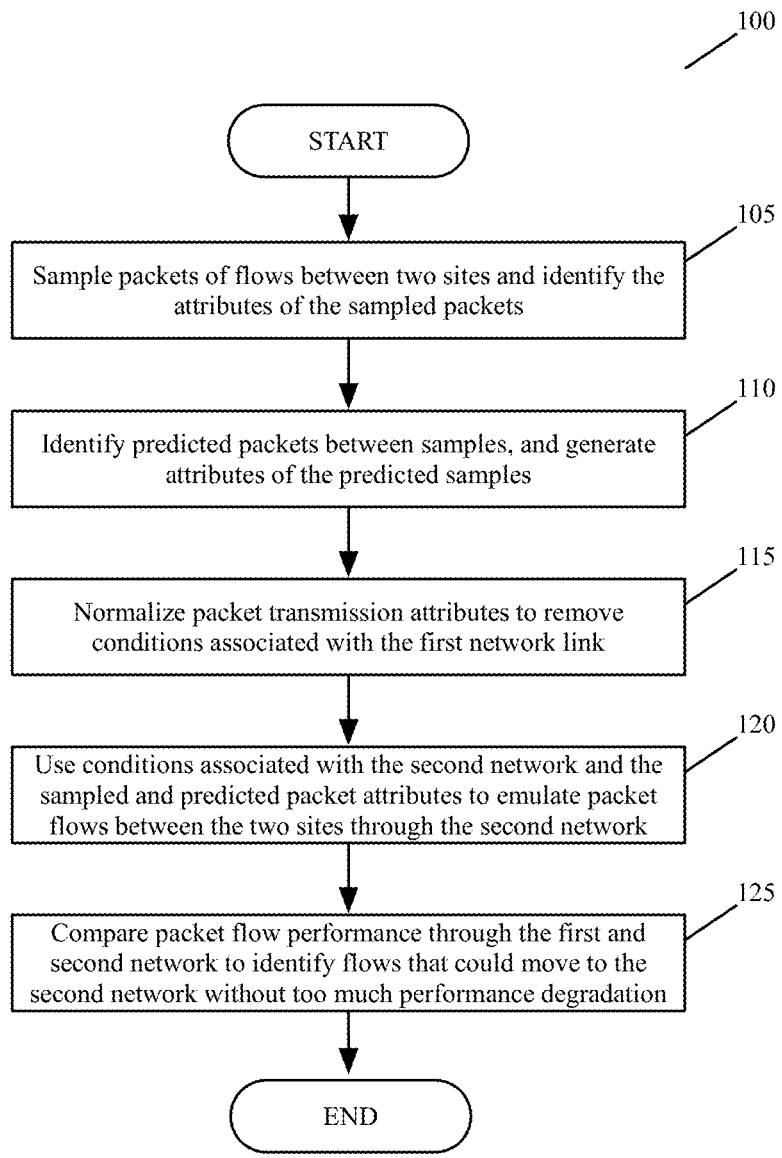
FIG. 1 illustrates process performed by a network analytics tool in some embodiments to implement the method of some embodiments.

FIG. 1 illustrates a process 100 performed by a network analytics tool in some embodiments to implement the method of some embodiments. This process is performed in some embodiments to evaluate network links used to connect different sites in an SD-WAN. For instance, some embodiments perform this assessment to determine whether a less expensive, secondary network link should be used for a subset of future flows between the first and second sites in the SD-WAN, instead of a more expensive primary network link. One example of a less-expensive, secondary network link in some embodiments is a commercial Internet connection (e.g., a cable modem connection) that has a lower quality of service (QoS) performance than an MPLS link, which is often used as a primary connection to connect different geographic sites to a WAN.

Figure 2:
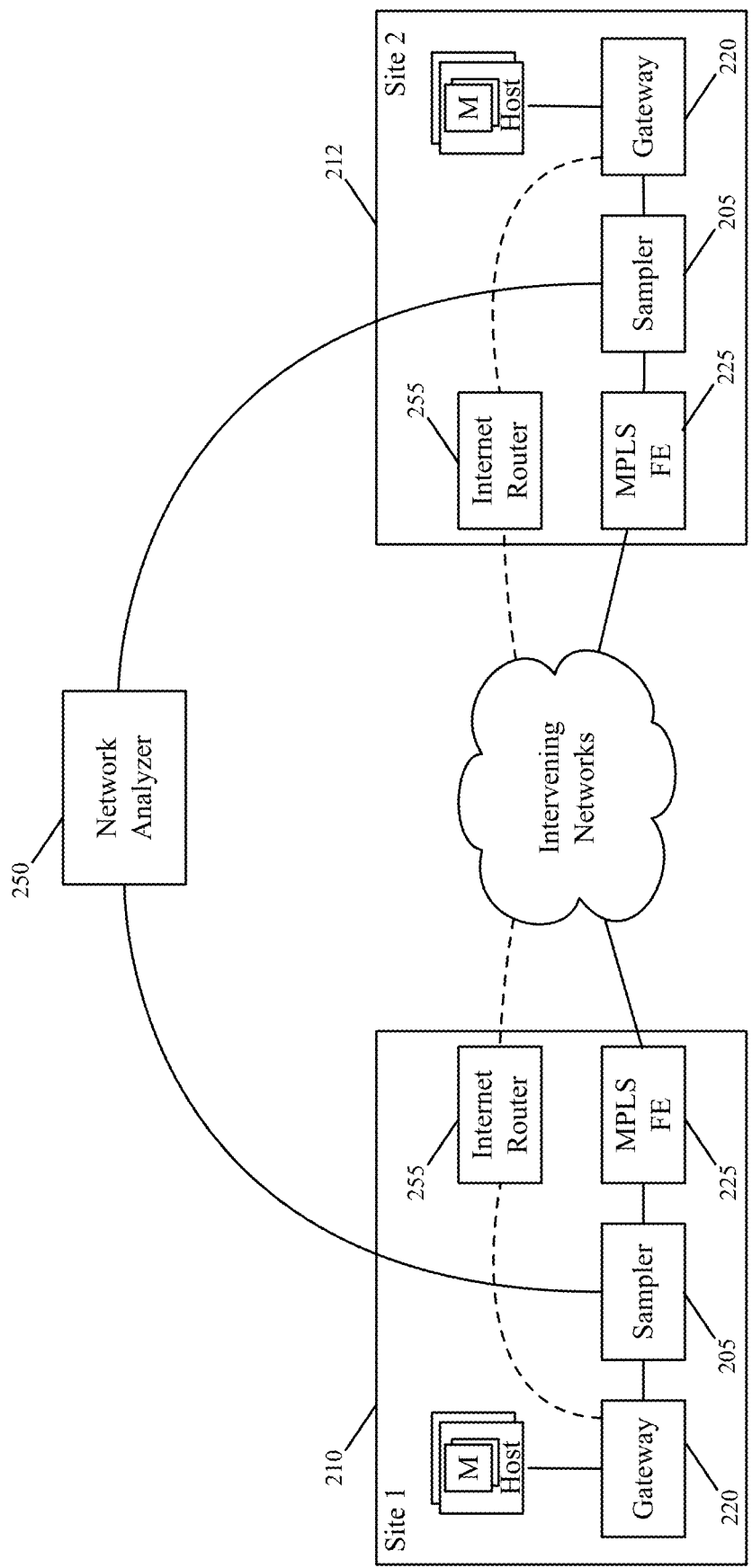
FIG. 2 illustrates sampling of packets along their egress paths from one SD-WAN site to another SD-WAN site.

The process 100 initially (at 105) identifies sample packets from a set of flows exchanged between first and second compute sites through a first network link (e.g., an MPLS link), and identifies attributes of the sampled packets (e.g., the packet headers, metadata regarding the packets, etc.). FIG. 2 illustrates that in some embodiments, the sample packets are collected by sFlow packet samplers 205 (which can be software engines or hardware appliances) that are deployed in the egress path of the packets from the first site 210 to the second site 212, and from the second site to the first site. In this example, each packet sampler 205 is deployed at the egress path between gateways 220 at the sites and the MPLS forwarding element 225 at these sites. In this example, the gateways 220 can also route packets to each other through commercial Internet routers 255.

The packet sampler 205 selects a subset sample of egress packets going from the gateways 220 to the MPLS forwarding element 225, and forwards copies of the selected subset of sample egress packets to a network analysis server 250 that the performs much of the analysis of the process 100. Instead of sending a copy of the sampled subset of egress packets, the packet sampler 205 sends attributes of the sampled subset of egress packets in some embodiments. As further described below, these attributes in some embodiments include a timestamp (e.g., the time when the packet was sampled or the time the packet was sent along the egress path), the flow identifier of the packet (i.e., the packet's five tuple identifier, which includes the source and destination IP address, source and destination port and protocol), and the packet size.

The network analysis server 250 executes on a computer at the first site 210 or the second site 212 in some embodiments, while it executes on a computer in a different datacenter (e.g., a public or private cloud datacenter) in other embodiments. The packet samplers 205 send the sampled packets or attributes of the sample packets to the network analyzer 250 through an intervening network (e.g., a local area network of the sampler's site and/or an external network, such as the Internet).

In other embodiments, the packet sampler 205 is only deployed at one of the two sites (e.g., the first site 210), but it samples both ingress and egress packets between its site (e.g., the first site) and the other site (e.g., the second site). Irrespective of how the sample packets are captured, the process 100 in some embodiments captures one or more attributes of the packets (e.g., the sizes of the packets, the transmission times of the packets, etc.), as further described below by FIGS. 3-4.

After identifying a sampled subset of the packets from the flows being exchanged between the first and second sites, the process 100 (at 110) identifies predicted packets that are part of the sampled flows between the sites, and identifies attributes for these predicted packets, in order to identify attributes of each sampled flow. In some embodiments, the network analysis server 250 identifies these predicted packets and their attributes to produce predicted complete flows that are exchanged between the first and second sites, so that it can perform its analysis of the suitability of the second network link (e.g., the commercial Internet connection link) based on complete flow descriptions. The generation of the predicted packets and the identification of their attributes will be further described below by reference to FIGS. 3-4.

Before using the identified and computed attributes of the sampled and predicted packets, the process 100 normalizes (at 115) these attributes to remove one or more conditions associated with the first network link. In some embodiments, the identified and computed attributes include packet delay attributes. To normalize the identified and computed delay attributes, the network analyzing server 250 in some of these embodiments removes the predicted delays for packets traversing between the first and second compute sites through the first network link from the identified and computed delay attributes of the packets, so that it can use these normalized delays to perform its emulation.

In some embodiments, the normalized delays represent communication delays between processes that exchange the flows in the set of flows (e.g., between processes that execute on devices at the first and second sites) after the removal of the delays associated with the packet passing through the first network. In other words, the normalizing is performed in some embodiments to render the assessment regarding the use of the second network link agnostic (i.e., independent) of operating conditions of the first network link. In some embodiments, the process 100 identifies and normalizes other packet-traversal attributes for packets traversing between the two sites. For instance, in some embodiments, the process 100 identifies packet jitter (which in some embodiments is computed as the derivative of the packet delay) for the packets exchanged between the first and second sites through the first network link, and then normalizes the identified packet jitter to remove the jitter due to the first network link.

To perform its normalizing operation, the process 100 in some embodiments identifies sets of request flows and response flows between the first and second sites, computes the delay between each request flow and the response flow associated with the request flow (i.e., between each request flow and its corresponding response flow), and removes communication delay through the first network from each computed delay, as further described below by reference to FIG. 7.

To perform its emulation, some embodiments monitor a set of operating conditions associated with the second network link, and then use the monitored set of operating conditions in the packet flow emulation of the network analyzing server 250. Accordingly, after normalizing the identified and computed attributes of the sampled and predicted packets, the process 100 uses (at 120) the normalized, identified and computed attributes of each sampled flow to emulate the flow passing between the first and second sites through the second network link (e.g., the cable modem Internet link) in order to assess whether the second network link should be used for future flows (e.g., future flows exchanged between the first and second compute sites). This emulation will be further described below by reference to FIG. 9

After generating the emulated packet flow results (specifying the predicted traversal of the sampled flows through the second network link), the network analyzing server 250 generates (at 125) a report that compares the traversal of the sampled flows through the second link with the traversal of the sampled flows through the first link. This report is then used to compare the quality of the second network link to the quality of the first network link on a per flow or per category of flow basis (e.g., for VoIP calls, for video conferencing, for VPN access, etc.). This generation and assessment of such reports will be further described below by reference to FIG. 10.

One of ordinary skill will realize that other embodiments perform their comparison of the first and second network links differently than the process 100. For instance, instead of sampling some of the packets of some or all of the flows exchanged between two sites through the first network link, other embodiments copy all of the packets, or capture attributes of all of the packets, of a subset of flows (e.g., all of the VoIP packets) exchanged between the two sites. To copy these packets or capture their attributes, some embodiments utilize packet mirroring software engines or hardware appliances deployed in the egress paths of the packets (e.g., between gateways 220 and MPLS forwarding elements 225).

The packet mirroring engines/appliances send a copy of each packet of the subset of flows (e.g., of the VoIP flows), or the captured attributes of each of these packets. In some embodiment, the packet mirrors use a deep packet inspection engine to determine that the packet belongs to the subset of flows. In other embodiments, the packet mirrors use tags associated with the packets (or some other commonly known technique to identify a payload of a packet flow) to determine that the packet belongs to the subset of flows. These tags are generated by context capturing engines or deep packet inspection engines executing on host computers that also execute the source machines of the packets. Examples of such engines are described in U.S. Pat. No. 10,802,857, which is incorporated herein by reference.

Figure 3:
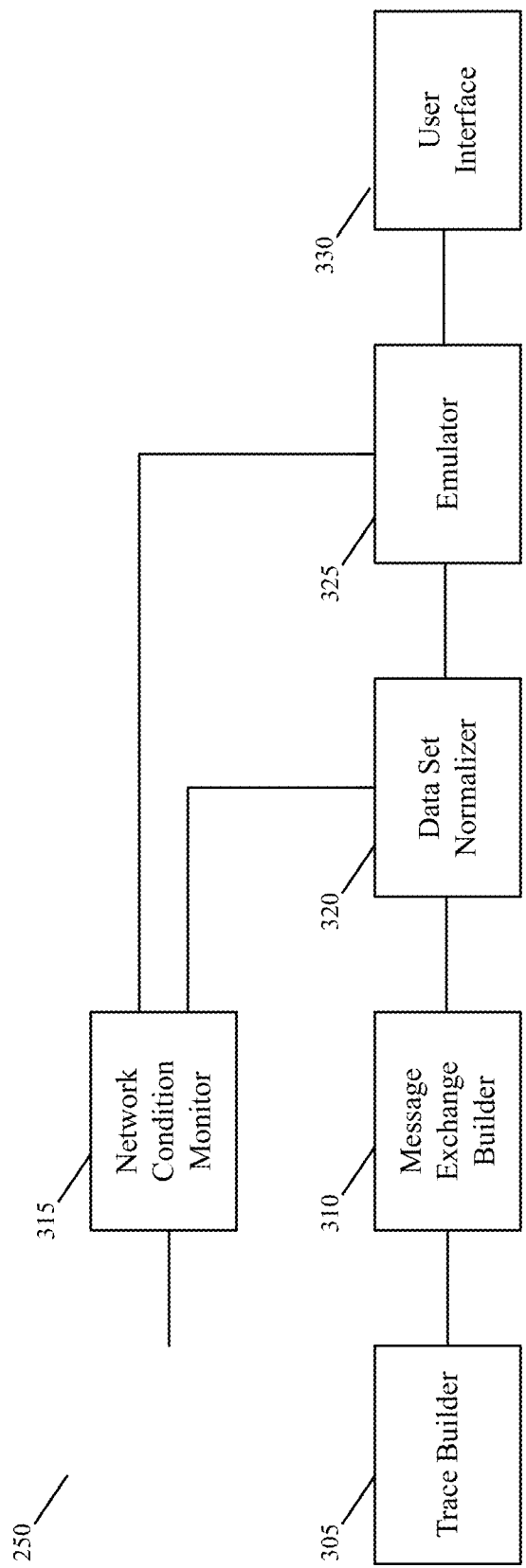
FIG. 3 conceptually illustrates the components of a network analyzing server of some embodiments.

FIG. 3 conceptually illustrates the components of the network analyzing server 250 of some embodiments. As shown, these components include a trace builder 305, a message exchange builder 310, a network condition monitor 315, a data set normalizer 320, an emulator 325 and a user interface 330. Instead of operating on one server in some embodiments, these components in other embodiments execute on multiple machines (e.g., multiple containers and/or virtual machines).

The trace builder 305 collects the packets forwarded by the packet samplers 205 (or packet mirrors) that ae deployed in the first site 210 and/or second site 212 at the packet egress data paths. From the packet sampled for each flow, the trace builder 305 completes each flow's definition by predicting the number of missing packets between the sampled packets and predicting the attributes of the predicted packets. The trace builder 305 builds a list of each sampled or predicted packet of each flow, and the attributes of these packets.

The OSI 7-layer model specifies that the application layer is independent of the networking (TCP/IP) layer. Hence, some embodiments use the application layer (e.g., HTTP) request-responses to build a trace independent of the network conditions. However, due to HTTPS, a significant fraction of the traffic is encrypted. For such flows, it is hard to obtain the exact requests and responses. Additionally, collecting an HTTP request/response can be intrusive (requires agents running on clients and servers). Accordingly, instead of collecting actual packets, some embodiments collect size data regarding the packets. Collecting the request and response packet sizes serves the purpose of eliminating the impact of MPLS network conditions and create a trace independent of the network conditions.

To identify HTTP request/response sizes, some embodiments sample the packets directly from the router connected to MPLS link by using an sFlow sampling tool, as described above. The sFlow sampling tool is versatile and is supported by most of the routers. As mentioned above, some embodiments do not store the entire sampled packet because the content of the packet does not have as much value for the emulation as its size. These embodiments instead store the packet sizes. For instance, for each sampled packet, a packet sampler 205 would store a timestamp, the flow identifier of the packet (i.e., the packet's five tuple identifier), and the packet size.

Table 405 of FIG. 4 illustrates examples of records 402, 404, 406, 408 created for four packets sampled at the first site 210 by the packet sampler 205. These records show the timestamp, five tuple identifier and size of each of the three sampled packets. For the example illustrated in table 405 of FIG. 4, table 410 shows the addition of a record 412 relating to a predicted packet that the trace builder 305 identifies between the records 402 and 404.

To identify the predicted missing packets that are not sampled by the packet samplers 205, the trace builder 305 uses the following characteristics of a TCP flow: (1) TCP sends data with increasing sequence numbers, (2) the TCP acknowledgement for sequence number X indicates packet with sequence number X was previously sent, and (3) TCP sends packets in bursts based on the congestion window (indirectly based on the data transmission rate).

Figure 5:
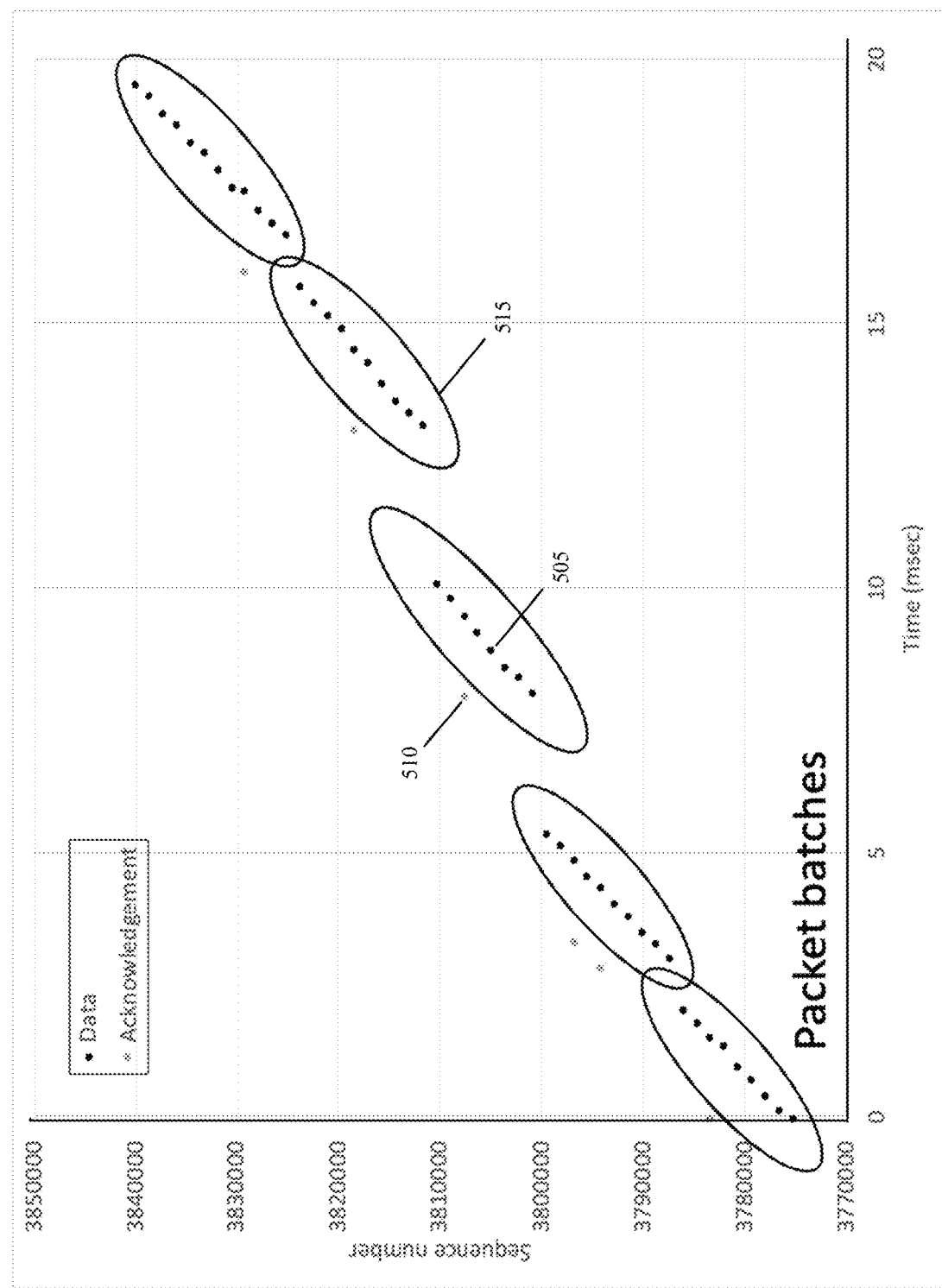
FIG. 5 presents an example that illustrates a typical TCP communication between two sites in an SD-WAN.

FIG. 5 presents an example that illustrates a typical TCP communication. This example illustrates TCP communication between two sites. When one node sends TCP data packets 505, the other node selectively sends acknowledgements 510. The data packets 505 contain a sequence number indicating the data position relative to the first data byte sent. The acknowledgement 510 contains the sequence number expected by the other end. Due to congestion control, packets are not sent at uniform intervals. Instead, they are sent in burst batches 515 as shown in FIG. 5.

To fill-in the missing packets (the packets not sampled by the packet sampler 205), the trace builder 305 performs the following operations. For each two consecutive sampled packets in a flow, the trace builder identifies the missing sequence numbers and the position for packets with such missing sequence numbers. The benefit of this approach is that it runs in O(n) time (n being the number of packets) with overall space complexity of O(n), and run-time space complexity (i.e., memory to store temporary data) of O(1).

Figure 6:
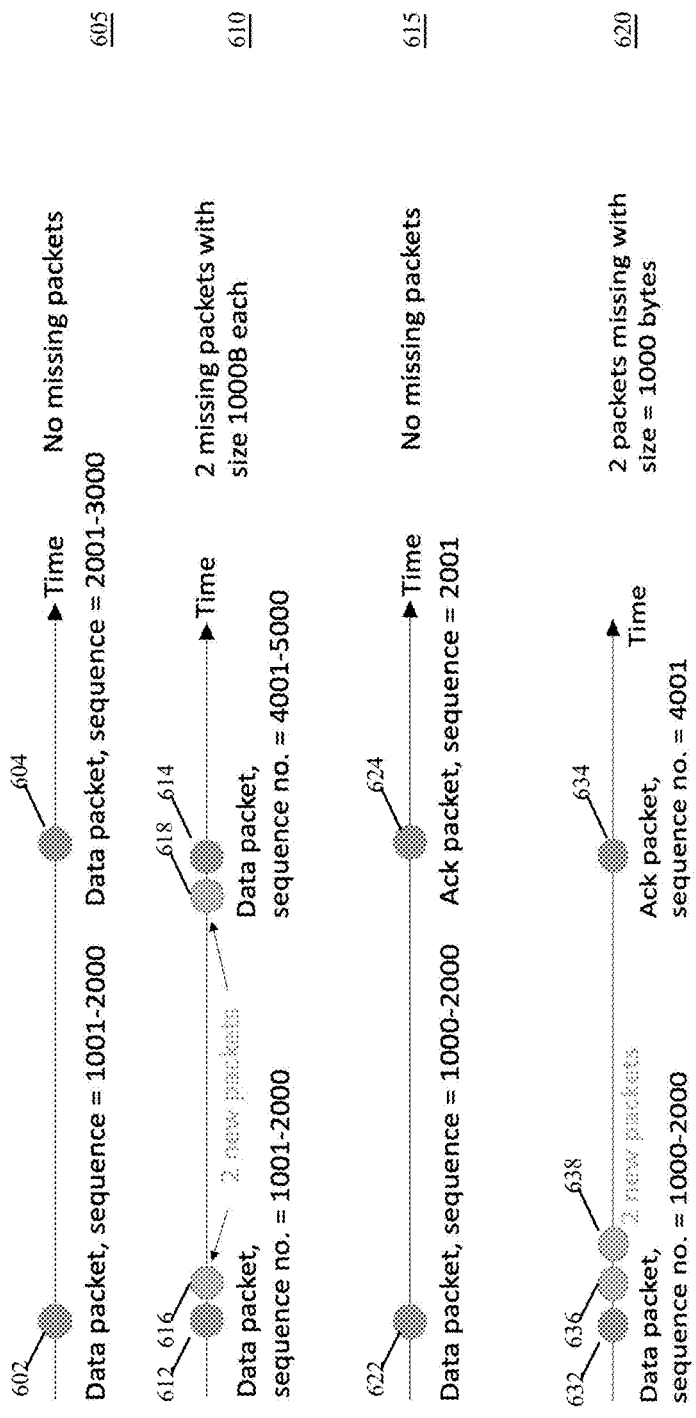
FIG. 6 illustrates four examples of how the trace builder identifies the predicted missing packets (i.e., how it fills-in the missing packets).

FIG. 6 illustrates four examples 605-620 of how the trace builder 305 identifies the predicted missing packets (i.e., how it fills-in the missing packets). Each of these four examples is based on how the two consecutive packets are received for each individual TCP flow from the packet sampler 205. In the first example 605, the two sampled packets are two data packets 602 and 604 (like data packets 505) sent from one site to the other site, and these two data packets have consecutive sequence numbers. For this case, the trace builder 305 does not predict any missing packets between the two sampled packets.

In the second example 610, the two sampled packets 612 and 614 are two data packets 505 with a gap in sequence numbers. Here, the trace builder 305 uses the maximum packet size (e.g., 1000 bytes) to determine number (N) of missing packets, and then assigns N/2 packets after the first packet 612 and N/2 packets before the second packet 614. In this example, the gap has a value of 2000 bytes, while the maximum TCP packet size is 1000 bytes. Hence, the trace builder 305 identifies predicted packets 616 and 618 and places these packets between the two packets 612 and 614.

In the third example 615, the two sampled packets are a data packet 622 (like a data packet 505) and an acknowledgment packet 624 (like an acknowledgment packet 510) with no gap in sequence numbers. For this case, the trace builder 305 does not predict any missing packet between the two sampled packets.

In the fourth example 620, the two sampled packets include one data packet 632 (like a data packet 505) and one acknowledgment packet 634 (like an acknowledgment packet 510) with a gap in sequence numbers between these two packets. Here, the trace builder 305 uses the maximum packet size (e.g., 1000 bytes) to determine number (N) of missing packets, and then assigns all N packets (in this case two packets 636 and 638) after the data packet 632 as an acknowledgment packet is sent right after corresponding sequence number is received. It can happen that the packets are reordered where data packets are received with non-monotonically increasing sequence numbers. In such situations, the trace builder 305 drops packets that are received out-of-order.

Storing packet trace data can have a large overhead. To store the metadata regarding request and response packet sizes, some embodiments use 8 bytes to store a timestamp, 12 bytes to store the five tuple ID, and 2 bytes to store the packet size for a total of 22 bytes. Assuming an average of 1 Gbps total traffic with an average 1 KB packet size, and a 131K number of packets per second, the total data size to record per second is 2.75 MB/s (i.e., 131K*22B). This would result in a total data size of 1.6 TB collected in 1 week (2.75 MB/s*7*24*3600). This is a large storage overhead.

To reduce the packet trace size, some embodiments use the following three compression techniques. These compression techniques work as the packet data arrives, and do not need to be performed on a batch of the data. First, instead of storing the five tuple ID for each packet record, all the packets associated with one flow are stored in one storage structure (e.g., one table, one file, etc.) associated with the five tuple. In the above example, this reduces the total size from 22 bytes per packet to about 10 bytes per packet (8 for the timestamp and 2 for the packet size), which, in turn, reduces the total storage size from 1.6 TB to 0.72 TB.

Second, the timestamp is encoded using delta compression where the "delta" value of the timestamp is stored instead of the actual timestamp. Assuming at least one packet is sent in 10 minutes, 20 bits are needed to store the delta values. Instead of storing an 8 byte timestamp, some embodiments use 3 byte values to represent the deltas. This reduces total storage size in the above example from 0.72 TB to about 0.27 TB.

Third, instead of storing absolute packet sizes, some embodiments store quantized packet sizes (i.e., identify the packet-size "bucket" with which the packet should be associated). Instead of storing 2 byte packet sizes, some embodiments store 1 byte packet sizes for 256 packet-size buckets. Additionally, some embodiments use dictionary compression to store the common packet sizes. These packet size compressions reduce the storage size in the above example from 0.27 TB to 0.14 TB. Hence, these three compression techniques have an 11.4 time reduction on the overall storage size in the example above.

After the trace builder 305 identifies the predicted packets, and stores the attributes of the sampled and predicted packets to complete the description of the bi-directional flow between the first and second sites, the message exchange builder 310 transforms the individual packets identified by the trace builder 305 into a series of http requests and responses. To create the client requests/responses, the message exchange builder 310 labels a node (a site) as "client" when it initiates the TCP connection (sends the SYN packet), while labeling the other node (the other site) as the "server" that sends the responses back to client. It identifies an individual request as all of the data packets from the client before the next batch of packets from the server, and identifies an individual response as all server packets before the next request packet.

For the example illustrated in FIG. 4, a third table 415 illustrates two sets of response and request records 422 and 424 for two sets of responses/requests that are identified in the second table 410 of this figure. Each response/request record 422 or 424 stores a timestamp, a five tuple ID, the size of the request packets in this record's sequence of requests, the size of the response packets in this record's sequence of responses, and an app-delay value. The app-delay value in some embodiments is the time delay between the last request in a request/response sequence and the first response in the request/response sequence.

Figure 7:
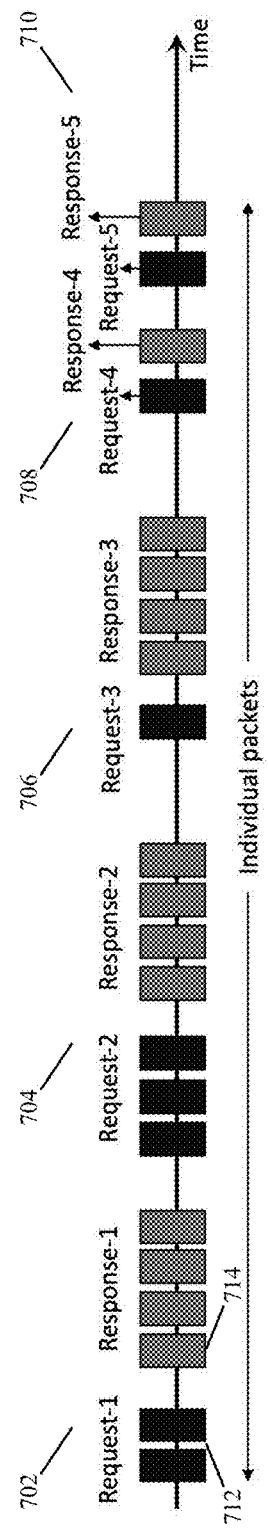
FIG. 7 illustrates five sequences of request and response flow.

To illustrate the app-delay value, FIG. 7 illustrates five sequences 702-710 of requests and responses. Each sequence has one or more request packets followed by one or more response packets. For instance, the fourth and fifth request/response sequences 708 and 710 have one request packet and one response packet, while the first and second request/response sequences 702 and 704 have more than one request packets and more than one response packets. The third request/response sequence 706 has one request packet and four response packets. In each of these sequences, the app-delay value is the time between the last request packet in the sequence (e.g., the request packet 712 in the first request/response sequence) and the first response packet in the sequence (e.g., the response packet 714).

After the message exchange builder 310 transforms the individual packets identified by the trace builder 305 into a series of http requests and responses, and identifies and stores one or more attributes of each sequence of requests/responses, the data set normalizer 320 normalizes these attributes to remove one or more conditions associated with the first network link (e.g., the MPLS link). For instance, to normalize the identified app-delay attribute of each request/response sequence identified by the message exchange builder 310, the data set normalizer in some of these embodiments removes the predicted delay for packet traversal between the first and second compute sites through the first network link from the app-delay attributes. This normalization is performed in some embodiments to render the assessment regarding the use of the second network link agnostic (i.e., independent) of operating conditions of the first network link.

To identify the predicted delay for the packet traversal between the first and second compute sites, the data set normalizer 320 receives the predicted delay of the first network link from the network condition monitor 315 based on measurements collected at the first and second sites regarding the first network link. In some embodiments, measurement agents at the first and second sites (e.g., measurement agents associated with the SD-WAN gateway 220) repeatedly generate delay measurement for the first network link by repeatedly pinging each other. In these embodiments, multiple different measured delays can be used as the predicted delays of the first network link at different times, and the closest measured delay for each request/response sequence can be subtracted from the sequence's measured app delay.

After the data set normalizer 320 normalizes each request/response sequence's attributes to remove one or more conditions associated with the first network link, the emulator 325 uses the normalized attributes of each request/response sequence of each sampled flow to emulate the passing of each flow between the first and second sites through the second network link. This is done in order to assess whether the second network link should be used for future flows (e.g., future flows exchanged between the first and second compute sites).

To perform its emulation, the emulator 325 needs to have data regarding the characteristics of the second network link. The emulator gets this data from the network condition monitor 315, which in some embodiments obtains this data from measurement agents at the first and second sites (e.g., measurement agents associated with the SD-WAN gateway 220). The network condition monitor 315 produces for each flow one or more sets of network condition metrics, such as Round-Trip-Time (RTT) values, peak bandwidth (BW) values, and packet drop.

As mentioned above, the second network link is a commercial Internet connection (e.g., a cable modem connection) in some embodiments. FIG. 8 illustrates an example of a table 805 used by the emulator 325 to summarize the Internet network conditions associated with two flows, which could be between the same pair of sites or between two different pairs of sites. In this example, the Internet network conditions are expressed in terms of one or more sets of RTT values, peak bandwidth values, and drop rates, with each set associated with a different instance in time.

When an IP address is accessible from Internet, it is straightforward to measure the Internet conditions (e.g., RTT, bandwidth etc.) easily by sending traffic between the first and second sites through the Internet connection of each site. However, the IP addresses can be private (e.g., 10.X.X.X). For example, 10.0.0.1 on the first site can be exchanging packets with 10.0.1.1 at the second site, but this exchange requires indirect routing (e.g., through tunneling) and even there it might require route changes that are not always possible.

To get Internet conditions for private destination IP addresses, some embodiments use one of two possible solutions. The first solution measures the Internet conditions using proximity. Based on the trace, these embodiments collect the IP addresses accessed from each site. For example, the first site (city=Lafayette) accesses 10.0.0.1, 10.0.0.2, and 10.1.0.1. For this site, the network condition monitor uses geo-tag values (e.g., 10.0.0.1, 10.0.0.2: Chicago. 10.1.0.1: New York) associated with the IP addresses to find the public IP addresses near the geo-tagged IP addresses. In some embodiments, the private IP addresses are geo-tagged by each site's network administrator or by the SD-WAN administrator.

The closest IP addresses are identified in some embodiments by using public clouds, CDNs and other publicly available PoPs (point-of-presence). Once the nearby public IP addresses are identified for the private IP addresses, the network condition monitor 315 uses agents to measure the Internet conditions (e.g., RTT (using syn-packets), packet drop by sending burst of packets, etc.) for these nearby public IP addresses. It then uses these measurements as the measurements for the Internet connections to the private IP addresses used by the flows.

The second solution uses the Internet conditions as specified by the users. Specifically, in some embodiments, the users provide the Internet conditions. These conditions can vary over time, e.g., the conditions are different on a weekend compared to a weekday, or the same for black Friday sales or other events. In these embodiments, customers can specify the Internet conditions including the RTT and peak bandwidth.

Based on the Internet network condition parameters, the emulator 325 uses the normalized attributes of each request/response sequence of each sampled flow to compute flow traversal attributes of each flow between the first and second sites through the second network link. In other words, the emulator 325 replays each sampled communication session through the second network link (e.g., through the Internet connection).

FIG. 9 illustrates how the emulator 325 replays the client requests/responses through the commercial Internet connections of the first and second sites 210 and 212. Specifically, it shows the emulator 325 using four machines, which are an orchestrator machine 905, a client machine 910, a network condition machine 920 and a server machine 915. Each of these machines in this example are VMs, but in other embodiments they can be other types of machines or processes, such as containers, etc.

The client and server machines 910 and 915 emulate the first and second site source and destination machines, while the network condition machine 925 emulates the intervening network fabric between these two sites. Through the network condition machine 920, the client machine 910 continually sends the emulated HTTP requests identified by the trace builder 305, while the server 915 continually sends the responses back to the client 910. The client and server machines send these packets based on timing data provided by the orchestrator. Throughout this process, the orchestrator 905 measures the flow completion times (FCT) for each flow.

More specifically, based on the input from orchestrator 905, the client and server machines 910 and 915 (1) establish a TCP connection and transfer data, (2) measure the flow completion time, and (3) report the measured FCTs to the orchestrator 905. In some embodiments, the TCP port numbers from the original trace are changed based on availability, e.g., if port 80 is occupied, then (for that connection) the server runs on the next available port (e.g., 81). Client measures the FCT (flow completion time) for each connection and reports its measurements to the orchestrator machine 905.

In this setup, the network condition machine 920 applies the network conditions received from orchestrator 905 to the packets that it passes from the client to the server or the server to the client. FIG. 9 presents a table 950 that expresses the network conditions for the different request/response sequences produced by the trace builder 305. As shown, these network conditions in some embodiments can be different for different connections. Based on the above input, the orchestrator 905 passes the request size and time to send the request to the client 910. Similarly, it passes the response size and time to the server 915. Additionally, the orchestrator 905 passes the network conditions to the network condition machine 920, which then uses these conditions in determining when to replay the packets sent from one site to the other site.

After generating the emulated packet flow results (specifying the predicted traversal of the sampled flows through the second network link), the emulator 325 in some embodiments stores the emulated results in a storage (not shown) that can be queried through the user interface 330 to generate one or more reports that compare the traversal of the sampled flows through the second link with the traversal of the sampled flows through the first link. Such reports can then be used to compare the quality of the second network link to the quality of the first network link on a per flow or per category of flow basis (e.g., for VoIP calls, for video conferencing, for VPN access, etc.).

For instance, when comparing the traversal of a particular flow or class of flows through the MPLS link versus the traversal of flows through commercial Internet link, the user interface 330 obtains the FCTs for the flow or flows through the MPLS network based on the records produced by the trace builder 305 and compares these FCTs with FCTs produced by the emulator 325. Based on this comparison, the user interface 330 produces a report that compares the different FCTs through the different links in order to allow the user to determine which flows it can move to the commercial Internet link.

FIG. 10 illustrates an example of a report 1000 generated through the user interface 330. As shown, this report provides a percentage of service degradation (as expressed through the FCT metric) for a particular volume of monitored traffic flow related to seven sets of flows (referred to in this figure as services). In this example, the user has specified that the commercial Internet connection should not be used if the performance degradation is more than 10%. Hence, the generated report 1000 identifies the commercial Internet connection as unsuitable for the first, third and fourth flow sets. This report also shows that the Internet connection is suitable for the second, fifth, sixth and seventh sets of flows. By moving these sets of flows from the MPLS link to the commercial Internet link, the user can move 53% of the traffic to the commercial Internet link and reduce its MPLS cost by a substantial amount.

Figure 11:
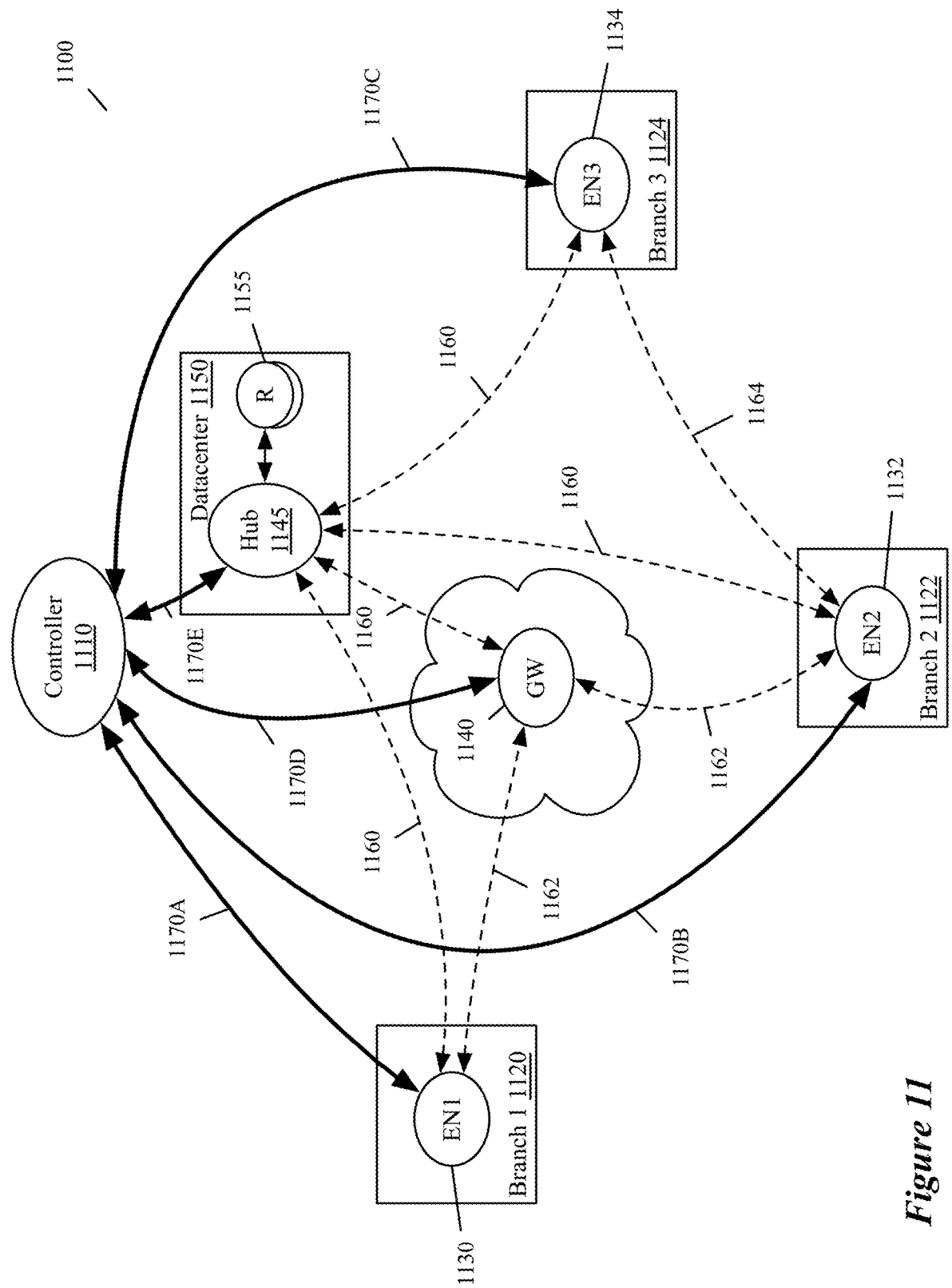
FIG. 11 illustrates an example of an SD-WAN of some embodiments.

As mentioned above, some embodiments of the invention are used to evaluate network links that are used to establish an SD-WAN. FIG. 11 illustrates an example of an SD-WAN 1100 (also referred to below as virtual network) for connecting multiple branch sites to each other and to a controller and at least one datacenter hub. As shown, the SD-WAN 1100 includes a controller 1110, three branch sites 1120-1124 that each include an edge forwarding node 1130-1134 (also referred herein as edge nodes or nodes), a cloud gateway 1140, and a datacenter 1150 with a hub 1145.

The edge nodes in some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations to other nodes, hubs, etc. in the virtual network. In some embodiments, the nodes are clusters of nodes at each of the branch sites. In other embodiments, the edge nodes are deployed at each of the branch sites as high-availability pairs such that one edge node in the pair is the active node and the other edge node in the pair is the standby node that can take over as the active edge node in case of failover.

An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, hubs like the hub 1145 can also be deployed in private cloud datacenters of a virtual WAN provider that hosts hubs to establish SD-WANs for different entities.

In the example SD-WAN 1100, the hub 1145 is a single tenant or multi-tenant forwarding element that is deployed on the premises of the datacenter 1150. The hub 1145 can be used to establish secure connection links (e.g., tunnels) with edge nodes at the particular entity's multi-computer sites, such as branch sites 1130-1134, third party datacenters (not shown), etc. For example, the hub 1145 can be used to provide access from each branch site 1120-1124 to each other branch site 1120-1124 (e.g., via the connection links 1160 that terminate at the hub 1145) as well as to the resources 1155 of the datacenter 1150. These multi-computer sites are often at different physical locations (e.g., different buildings, different cities, different states, etc.), according to some embodiments. In some embodiments, hubs can be deployed as physical nodes or virtual nodes. Additionally, hubs in some embodiments can be deployed on a cloud (e.g., as a set of virtual edges configured as a cluster).

In the SD-WAN 1100, the hub 1145 also provides access to the resources 1155 of the datacenter 1150 as mentioned above. The resources in some embodiments include a set of one or more servers (e.g., web servers, database servers, etc.) within a microservices container (e.g., a pod). Conjunctively, or alternatively, some embodiments include multiple such microservices containers, each accessible through a different set of one or more hubs of the datacenter (not shown). The resources, as well as the hubs, are within the datacenter premises, according to some embodiments. While not shown, some embodiments include multiple different SaaS datacenters, which may each be accessed via different sets of hubs, according to some embodiments. In some embodiments, the SaaS datacenters include datacenters for video conferencing SaaS providers, for middlebox (e.g., firewall) service providers, for storage service providers, etc.

Additional examples of resources accessible via the hub 1145, in some embodiments, include compute machines (e.g., virtual machines and/or containers providing server operations), storage machines (e.g., database servers), and middlebox service operations (e.g., firewall services, load balancing services, encryption services, etc.). In some embodiments, the connections 1160 between the branch sites 1120-1124 and the hub 1145 are secure encrypted connections that encrypt packets exchanged between the edge nodes 1130-1134 of the branch sites 1120-1124 and the hub 1145. Examples of secure encrypted connections used in some embodiments include VPN (virtual private network) connections, or secure IPsec (Internet Protocol security) connection.

In some embodiments, multiple secure connection links (e.g., multiple secure tunnels) can be established between an edge node and the hub 1145. When multiple such links are defined between a node and a hub, each secure connection link, in some embodiments, is associated with a different physical network link between the node and an external network. For instance, to access external networks in some embodiments, a node has one or more commercial broadband Internet links (e.g., a cable mode and a fiber optic link) to access the Internet, a wireless cellular link (e.g., a 5G LTE network), etc. The collection of the edge nodes, gateway, datacenter hub, controller, and secure connections between the edge nodes, gateway, datacenter hub, and controller form the SD-WAN 1100.

As mentioned above, the controller 1110 communicates with each of the nodes 1130-1134 at the branch sites 1120-1124, in some embodiments, to exchange information via the connection links 1170A-1170C. The controller 1110 also communicates with the gateway 1140 and hub 1145 through the connection links 1170D-1170E to exchange information. While illustrated as individual connection links, the links 1170A-1170E are sets of multiple connection links, according to some embodiments. In addition to the connection links 1170A-1170E and 1160, edge nodes 1132 and 1134 are connected via a connection link 1164, while edge nodes 1130 and 1132 are connected to the gateway 1140 via connection links 1162. The gateway 1140 in this example is responsible for relaying information between edge nodes (e.g., edge nodes 1130 and 1132, which do not share a direct connection). Also, the gateway 1140 in some embodiments is used to set up direct edge-to-edge connections. In some embodiments, the gateway 1140 can be used to provide the edge nodes with access to cloud resources (e.g., compute, storage, and service resources of a cloud datacenter).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
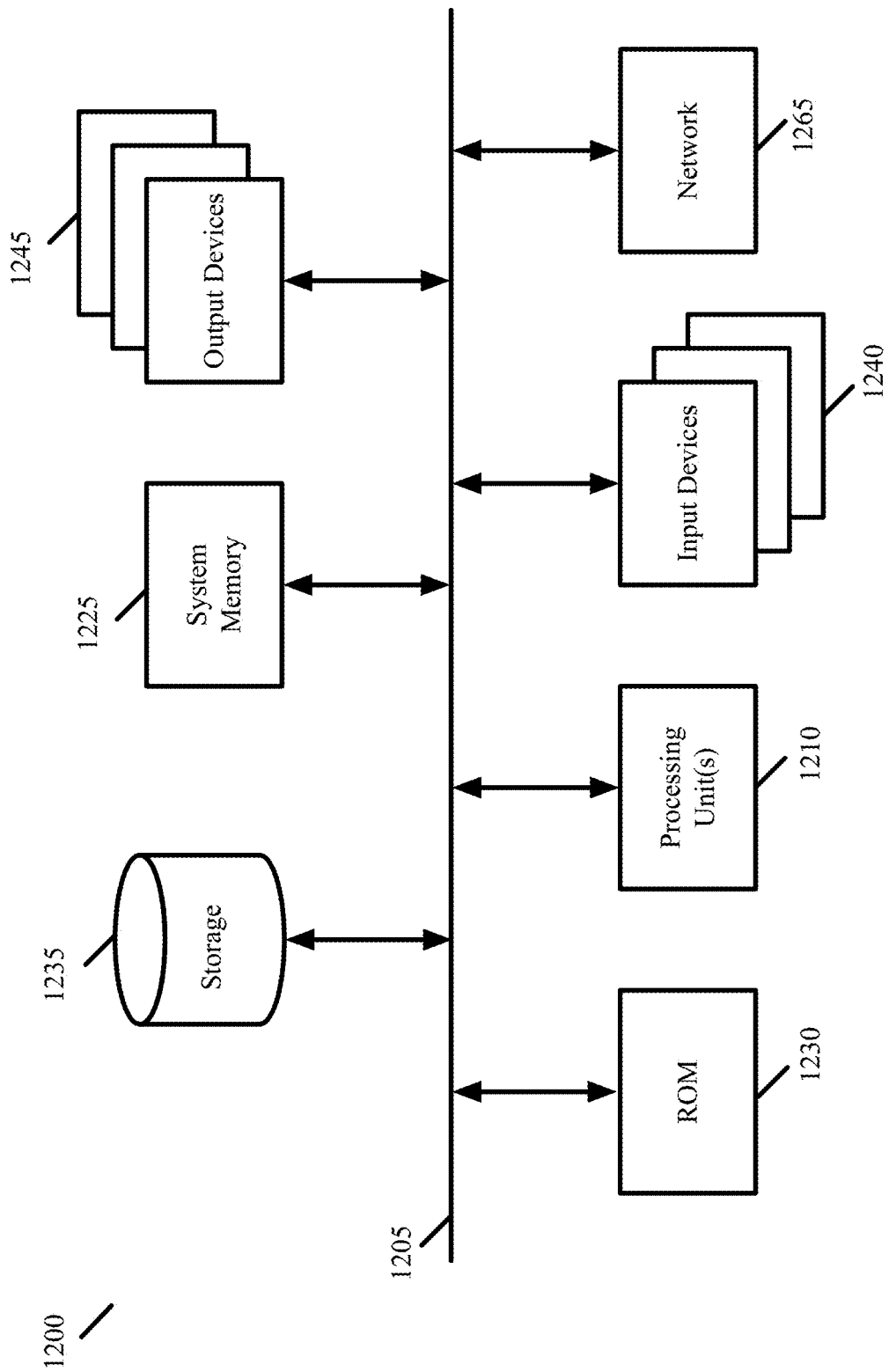
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, and network analyzers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system. The input devices 1240 include alphanumeric keyboards and pointing devices (also called "cursor control devices"). The output devices 1245 display images generated by the computer system. The output devices 1245 include printers and display devices, such as cathode ray tubes (CRT) or liquid crystal displays (LCD). Some embodiments include devices such as a touchscreen that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described examples illustrate virtual corporate WANs of corporate tenants of a virtual network provider. One of ordinary skill will realize that in other embodiments, the SD-WANs are deployed for non-corporate tenants (e.g., for schools, colleges, universities, non-profit entities, etc.).

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims

The invention claimed is:

1. A method of assessing changes to network links used to connect different compute sites, the method comprising:
   identifying packets of a subset of flows exchanged between first and second compute sites connected through a first network link;
   identifying, for each identified packet, at least one packet-traversal attribute that relates to the packet's traversal from the first site to the second site through the first network link;
   adjusting the identified packet-traversal attributes of the identified packets in order to make the identified packet-traversal attributes independent of a set of conditions associated with the first network link;
   using the adjusted packet-traversal attributes of the packets to perform an emulation of the subset of flows being exchanged between the two compute sites through a second network link in order to assess whether the second network link could be used for future flows without a performance degradation that is more than a threshold amount, wherein the second network link is less expensive and has lower performance than the first network link.

2. The method of claim 1, wherein the future flows comprise future flows exchanged between the first and second compute sites.

3. The method of claim 1, wherein
   the identified packet-traversal attributes comprise packet delay attributes, and
   adjusting the identified packet-traversal attributes comprises normalizing the identified packet-traversal delays by removing delays associated with traversal of packets between the first and second compute sites through the first network link, said normalizing producing normalized delays representing communication delays between processes that exchange the flows in the subset of flows and that execute on devices at the first and second sites.

4. The method of claim 3, wherein the removed delays are predicted delays associated with traversal of packets between the first and second compute sites through the first network link.

5. The method of claim 3, wherein the normalizing is performed to render the assessment regarding the use of the second network link independent of operating conditions of the first network link.

6. The method of claim 3, wherein normalizing comprises:
identifying sets of request flows and response flows between the first and second compute sites;
computing the delay between each request flow and the response flow associated with the request flow;
removing from the computed delay the delay associated with traversal of packets between the first and second sites through the first network link.

7. The method of claim 1, wherein using the adjusted packet-traversal attributes comprises:
monitoring a set of operating conditions associated with the second network link; and
using the monitored set of operating conditions to perform the emulation.

8. The method of claim 1, wherein using the adjusted packet-traversal attributes comprises:
generating predicted-traversal attributes for the subset of flows if the subset of flows had been exchanged through the second network link; and
comparing the generated predicted attributes for the packet flows through the second network link with the identified packet-traversal attributes associated with packet flows through the first network link to compare a quality of the second network link to a quality of the first network link.

9. The method of claim 1, wherein the assessment is performed to determine whether the second network link should be used for a subset of future flows between the first and second sites.

10. A non-transitory machine readable medium storing a program for assessing changes to network links used to connect different compute sites, the program for execution by at least one processing unit of a computer, the program comprising sets of instructions for:
identifying packets of a subset of flows exchanged between first and second compute sites connected through a first network link;
identifying, for each identified packet, at least one packet-traversal attribute that relates to the packet's traversal from the first site to the second site through the first network link;
adjusting the identified packet-traversal attributes of the identified packets in order to make the identified packet-traversal attributes independent of a set of conditions associated with the first network link;
using the adjusted packet-traversal attributes of the packets to perform an emulation of the subset of flows being exchanged between the two compute sites through a second network link in order to assess whether the second network link could be used for future flows, wherein the second network link is less expensive and has lower performance than the first network link.

11. The non-transitory machine readable medium of claim 10, wherein the future flows comprise future flows exchanged between the first and second compute sites.

12. The non-transitory machine readable medium of claim 10, wherein the identified packet-traversal attributes comprise packet delay attributes, and the set of instructions for adjusting the identified packet-traversal attributes comprises a set of instructions for normalizing the identified packet-traversal delays by removing delays associated with traversal of packets between the first and second compute sites through the first network link, said normalizing producing normalized delays representing communication delays between processes that exchange the flows in the subset of flows and that execute on devices at the first and second sites.

13. The non-transitory machine readable medium of claim 12, wherein the removed delays are predicted delays associated with traversal of packets between the first and second compute sites through the first network link.

14. The non-transitory machine readable medium of claim 12, wherein the set of instructions for the normalizing is performed to render the assessment regarding the use of the second network link independent of operating conditions of the first network link.

15. The non-transitory machine readable medium of claim 12, wherein the set of instructions for normalizing comprises the sets of instructions for:
identifying sets of request flows and response flows between the first and second compute sites;
computing the delay between each request flow and the response flow associated with the request flow; and
removing from the computed delay the delay associated with traversal of packets between the first and second sites through the first network link.

16. The non-transitory machine readable medium of claim 10, wherein the set of instructions for using the adjusted packet-traversal attributes comprises sets of instructions for:
monitoring a set of operating conditions associated with the second network link; and
using the monitored set of operating conditions to perform the emulation.

17. The non-transitory machine readable medium of claim 10, wherein the set of instructions for using the adjusted packet-traversal attributes comprises sets of instructions for:
generating predicted-traversal attributes for the subset of flows if the subset of flows had been exchanged through the second network link; and
comparing the generated predicted attributes for the packet flows through the second network link with the identified packet-traversal attributes associated with packet flows through the first network link to compare a quality of the second network link to a quality of the first network link.

18. The non-transitory machine readable medium of claim 10, wherein the identified packets are packets captured by a packet mirror.

19. The non-transitory machine readable medium of claim 18, wherein the identified packets are packets having a particular type of payload.

* * * * *